United States Patent [19]

Keppeler et al.

[11] Patent Number: 5,266,408

[45] Date of Patent: * Nov. 30, 1993

[54] MAGNETIC RECORDING MEDIA

[75] Inventors: Uwe Keppeler, Ludwigshafen; Hermann Dikow, Hockenheim; Helmut Auweter, Limburgerhof; Michael Bobrich, Boehl-Iggelheim; Jochen Rudolph, Dossenheim; Gregor Brodt, Heppenheim; Albert Kohl, Laumersheim; Werner Lenz, Bad Durkheim; Rudolf Suettinger, Heidelberg, all of Fed. Rep. of Germany

[73] Assignee: BASF Mangetic GmbH, Mannheim, Fed. Rep. of Germany

[ * ] Notice: The portion of the term of this patent subsequent to Dec. 11, 2009 has been disclaimed.

[21] Appl. No.: 804,658

[22] Filed: Dec. 11, 1991

[30] Foreign Application Priority Data

Dec. 13, 1990 [DE]  Fed. Rep. of Germany ....... 4039749

[51] Int. Cl.$^5$ ............ B32B 27/40; G11B 5/70
[52] U.S. Cl. .............. 428/425.9; 252/62.54; 428/694; 428/900
[58] Field of Search .......... 428/694, 900, 425.9; 252/62.54

[56] References Cited

U.S. PATENT DOCUMENTS

| 2,871,218 | 1/1959 | Schollenberger | 525/440 |
| 2,899,411 | 8/1959 | Schollenberger | 528/76 |
| 3,320,090 | 5/1967 | Graubart | 428/425.9 |
| 4,152,485 | 5/1979 | Mizumura et al. | 428/425 |
| 4,420,531 | 12/1983 | Tokuda | 428/329 |
| 4,423,115 | 12/1983 | Tokuda et al. | 428/425.9 |
| 4,477,531 | 10/1984 | Kohler et al. | 428/425.9 |
| 5,082,737 | 1/1992 | Bobrich et al. | 428/694 |

FOREIGN PATENT DOCUMENTS

| 0143337 | 6/1985 | European Pat. Off. . |
| 0193084 | 4/1988 | European Pat. Off. . |
| 2054622 | 2/1981 | United Kingdom . |

Primary Examiner—Paul J. Thibodeau
Assistant Examiner—D. S. Nakarani
Attorney, Agent, or Firm—Keil & Weinkauf

[57] ABSTRACT

Magnetic recording media consist of a nonmagnetic substrate and one or more magnetizable layers bonded thereon and based on a polyurethane binder, the binder consisting of not less than 50% by weight of a branched polyurethane elastomer having sulfonate groups and possessing urea groups at the chain ends.

19 Claims, No Drawings

MAGNETIC RECORDING MEDIA

The present invention relates to magnetic recording media, consisting of a nonmagnetic substrate and one or more magnetizable layers bonded thereon and based on a polyurethane binder, the binder consisting of not less than 50% by weight of a branched polyurethane elastomer having metal sulfonate groups and possessing urea groups the chain ends.

BACKGROUND OF THE INVENTION

Magnetic recording media are having to meet increasingly high requirements with respect to recording, playback and aging resistance. The binder is becoming more and more important for meeting these requirements.

Higher packing density of magnetic material in the layer is therefore desirable for improving the magnetic properties, which leads to a reduction in the binder content of the layer. Attempts have also been made to obtain an improved signal/noise ratio by the use of increasingly finely divided magnetic materials having a pronounced acicular shape. These materials are furthermore very often surface-modified to reduce aging phenomena. Because of such measures, both the distribution of the pigments during the dispersing process and the achievement of good dispersion stability are made considerably more difficult. In general, however, the magnetic layers must be very flexible and have high resilience and good tensile strength. In addition, in order to avoid drops in output level, there is an increasing need for a reduction in the coefficients of friction, an increase in the abrasion resistance and better wear properties. Moreover, the magnetic layer must be mechanically stable, in particular at high temperatures and high atmospheric humidity.

It is known that magnetic layers which are subjected to great mechanical stresses contain polyurethane elastomers which prove advantageous as binders. Polyesterurethanes as described in DE-B 1 106 959, DE-B 2 753 694, EP-A 0 069 955 or U.S. Pat. No. 2,899,411 have proven particularly suitable.

However, these binders cannot be used in the light of the requirements and measures described above. In many cases, pigment wetting and pigment dispersing are adversely affected so that any sintered material is insufficiently broken up during the milling process or agglomeration of pigment particles is not adequately prevented, leading to poor orientability and hence to reduced packing densities. Relatively small amounts of low molecular weight dispersants are therefore added in order to facilitate the dispersing process. Although these dispersants have good deagglomeration characteristics, they do not satisfactorily stabilize the dispersion. Higher molecular weight dispersing resins are is therefore often also used as additional components. DE-A 30 26 357 and DE 31 37 293 describe, for example, the addition of polyester resins which have $SO_3M$ groups.

However, these methods for improving the dispersing process have disadvantages. Thus, low molecular weight dispersants may be exuded under unfavorable climatic conditions, such as high temperature and/or high atmospheric humidity. This results in deposits on all parts in contact with the tape, in particular on the head, in recording or playback apparatuses, causing drops in output level. When dispersing resins are used, it is possible, on the other hand, for compatibility problems to occur in the dispersion. Often, these substances are not film formers and therefore also result in blocking. Moreover, the mechanical properties of these dispersing resins are often not adapted to the properties of the polyurethane used as the main binder. A deterioration in the mechanical properties always also means an increase in abrasion.

To improve the dispersing properties of the polyurethane binder itself, it was proposed at an early stage to incorporate polar groups into the binder. These polar groups can in principle be introduced by any component which is used in the preparation of the polyurethane. Polyesters having polar groups (cf. inter alia DE-A 28 33 845) are most frequently used. The incorporation of diols which carry additional polar groups is described in, for example, JP-A 57 092 421, German Laidopen Application DOS 3,814,536 or EP-A 193 084. The subsequent incorporation of the polar groups by nucleophilic substitution ($S_n$) reaction at the terminal OH groups of the polyurethanes is disclosed in JP-A 57 092 422. The polyurethanes described to date and carrying polar groups have improved dispersing behavior but the improvement is still insufficient for many requirements.

Another disadvantage of all the polyurethanes described is that the required resilience is frequently obtained at the expense of insufficient hardness and a tendency to surface tack. In the prior art, appropriate polyurethanes are therefore combined with other binders. Proposed binder combinations are, for example, mixtures of polyurethanes with phenoxy resins, with vinylidene chloride/acrylonitrile copolymers, with vinyl chloride/acrylate copolymers, with polycarbonates or with polyesters. DE-A 32 39 160 may be mentioned by way of example. Although these binder combinations lead to an improvement in the mechanical properties of the magnetic layer, the dispersing behavior of such a combination is adversely affected. Consequently, the particular properties of the magnetic materials are not satisfactorily displayed. This is manifested in a lower orientation ratio, lower residual induction and hence lower sensitivity at short and long wavelengths and a less satisfactory output level of the resulting recording media.

A possible method for increasing the hardness of the polyurethanes is to increase the concentration of urethane and urea groups. However, such measures very rapidly lead to products which are insoluble in conventional solvents, such as tetrahydrofuran (EP-A 01 43 337). According to DE-A 31 37 293, nonmagnetic particles are admixed to increase the hardness.

However, the measures described are insufficient for simultaneously meeting the increased requirements with regard to the binder system. Furthermore, a combination of the polyurethanes and other binders is often essential for achieving individual effects.

It is an object of the present invention to provide thermoplastic and resilient polyurethanes which are readily soluble in ethers and/or ketones and have excellent dispersing properties and through the use of which it is possible to produce magnetic layers having high mechanical stability and improved recording characteristics.

SUMMARY OF THE INVENTION

We have found that this object is achieved by magnetic recording media consisting of a nonmagnetic substrate and one or more magnetic layers which are bonded thereon and are based on a magnetic material finely distributed in a binder consisting of not less than 50% by weight of a thermoplastic polyurethane if the thermoplastic polyurethane used is an isocyanate-free, branched polyurethane which is soluble in ethers and ketones and has OH-containing or OH-free urea groups at the chain ends and a molecular weight of from 30,000 to 200,000, and which is prepared from A) 1 mol of a polydiol having a molecular weight of from 400 to 10,000, B) from 0.3 to 10 mol of a mixture of B1) one or more diols of 2 to 18 carbon atoms and B2) a diol having one or more sulfonate groups, C) from 0.01 to 1 mol of a tri- or polyol of 3 to 25 carbon atoms, D) from 1.3 to 13 mol of one or more diisocyanates of 6 to 30 carbon atoms and E) from 0.09 to 2 mol of an amino alcohol or of an OH-free monoamine of 2 to 16 carbon atoms, with the proviso that the ratio of the OH groups of the components A to C to the NCO groups of component D to the amino groups of component E is 1:1.03–1.3:0.03–0.3.

The branched polyurethane used for the novel recording media accordingly has from 4 to 30, in particular from 6 to 24, preferably from 8 to 24, OH groups per molecule, which are bonded to the chain ends via urea groups. A weight average molecular weight of not less than 30,000 and not more than 200,000 is required for achieving the necessary mechanical properties. Molecular weights of from 60,000 to 110,000 are preferred. However, an OH number greater than 30 is a disadvantage in the case of high molecular weights since the molecules are too highly branched when the OH numbers are too high, making preparation and use more difficult since an excessively high degree of branching leads to coiled molecules and partially crosslinked polymers. From 1 to 15, in particular from 2 to 10, branches with a mean chain length of over 10,000 lead to the desired polyurethane elastomers.

The polyurethanes having such a structure generally possess, in the uncrosslinked state, a hardness of 18–140 s according to DIN 53 157. They furthermore have a modulus of elasticity (according to DIN 53 457) of 20–2,500 N/mm$^2$, an elongation at break of >100% (DIN 53 455) and a tensile strength of >30 N/mm$^2$ (DIN 53 455). The softening point is from 80° to 180° C.

In a further embodiment of the novel recording medium, a polyisocyanate can be added to the dispersion, essentially consisting of the magnetic material and special polyurethane, before application to the substrate. A large number of organic di-, tri- or polyisocyanates or isocyanate prepolymers having a molecular weight of up to 10,000, preferably from 500 to 3,000, can be used for this crosslinking. Polyisocyanates or isocyanate prepolymers which carry more than 2 NCO groups per molecule are preferred. Polyisocyanates based on toluylene diisocyanate, hexamethylene diisocyanate or isophorone diisocyanate, which are formed by a polyaddition reaction with di- and triols or by biuret and isocyanurate formation, have proven particularly suitable. An adduct of toluylene diisocyanate with trimethylolpropane and diethylene glycol is particularly advantageous. By admixing the abovementioned polyisocyanates, preferably with the prepared magnetic dispersion before application to the substrate, the mechanical properties of the novel recording media are very substantially further improved in respect of their abrasion resistance, the thermoplasticity of the magnetic layer being reduced. The amount of polyisocyanates added for this purpose is in general about 1–20, preferably 4–15, % by weight, based on the total amount of the binder.

DETAILED DESCRIPTION OF THE INVENTION

The polyurethane characterizing the novel recording media is composed of conventional components.

A polyesterol, polyetherol or polycarbonate having a molecular weight of from 400 to 10,000, preferably from 500 to 2,500, is used as component A). The polydiols are advantageously predominantly linear polymers having two terminal OH groups. The acid number of the polydiols is less than 10, preferably less than 3. The polyesterols can be prepared in a simple manner by esterification of aliphatic or aromatic dicarboxylic acids of 4 to 15, preferably 4 to 8. carbon atoms with aliphatic or cycloaliphatic glycols, preferably of 2 to 20 carbon atoms, or by polymerization of a lactone of 3 to 10 carbon atoms. For example, glutaric acid, pimelic acid,, suberic acid, sebacic acid, dodecanedioic acid, isophthalic acid and preferably adipic acid, succinic acid and terephthalic acid can be used as dicarboxylic acids. The dicarboxylic acids can be used individually or as mixtures. For the preparation of the polyesterols, it may be advantageous to use the corresponding acid derivatives, such as anhydrides or carbonyl chlorides, instead of the dicarboxylic acids. Examples of suitable glycols are diethylene glycol, pentanediol, decane-1,10-diol and 2,2,4-trimethylpentane-1,5-diol.

Ethane-1,2-diol, butane-1,4-diol, hexane-1,6-diol, 2,2-dimethylpropane-1,3-diol, 1,4-dimethylolcyclohexane, 1,4-diethanolcyclohexane and 1,4-diethanolpropane are preferably used. Examples of lactones suitable for preparation of the polyesterols are α,α-dimethyl-β-propiolactone, butyrolactone and preferably caprolactone. The polycarbonates are generally based on hexane-1,6-diol.

The polyetherols are essentially linear substances which have terminal hydroxyl groups, contain ether bonds and have a molecular weight of about 600–4,000, preferably 1,000–2,000. Suitable polyetherols can readily be prepared by polymerization of cyclic ethers, such as tetrahydrofuran, or by reaction of one or more alkylene oxides, where the alkylene radical has 2 to 4 carbon atoms, with an initiator molecule which contains two bonded active hydrogen atoms in the alkylene radical. Examples of alkylene oxides are ethylene oxide, 1,2-propylene oxide, epichlorohydrin and 1,2- and 2,3-butylene oxide. The alkylene oxides can be used individually, alternately in succession or as a mixture. Examples of suitable initiator molecules are water, glycols, such as ethylene glycol, propylene glycol, butane-1,4-diol and hexane-1,6-diol, amines, such as ethylenediamine, hexamethylenediamine and 4,4'-diaminodiphenylmethane, and amino alcohols, such as ethanolamine. As in the case of the polyesterols, the polyetherols too can be used alone or as mixtures.

Either aliphatic diols of 2 to 10, preferably 4 to 6, carbon atoms, for example ethane-1,2-diol, propane1,3-diol, butane-1,4-diol, hexane-1,6-diol, pentane-1,5-diol, decane-1,10-diol, 2-methylpropane-1,3-diol, 2-methyl-2-butylpropane-1,3-diol, 2,2-dimethylbutane-1,4-diol, neopentylglycol hydroxypivalate, diethylene glycol, triethylene glycol, methyldiethanolamine, 1, 4-dimethylolcyclohexane or 1,4-diethanolcyclohexane, or aromatic diols, eg. ethylene or propylene adducts of bisphenol A or ethylene oxide adducts of hydroquinone, are used as component B1).

The diols can be used individually or as mixtures. It is also possible to use minor amounts of diamines of 2 to 15 carbon atoms, such as ethylenediamine, 1,6-hexamethylenediamine, 4,9-dioxododecane1,12-diamine or 4,4'-diaminodiphenylmethane, or amino alcohols, eg. monoethanolamine, monoisopropanolamine and 2-amino-2-methylpentan-2-ol. It has proven advantageous to incorporate the resulting urea groups in the polymer chain. The urea groups at the chain end are of minor importance here.

The stated diols, as building blocks B, may furthermore be partly or completely replaced by water.

The diols forming component B2) contain one or more —SO₃M groups. Examples of these are compounds, as described in DE 34 07 562, of the formula (I)

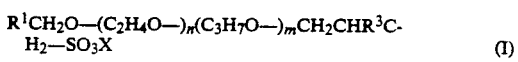
(I)

where R¹ is

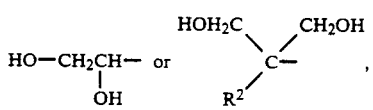,

R² is CH₃—, C₂H₅— or C₃H₇—, R³ is H— or CH₃—, X is H—, an alkali metal or ammonium, n is from 0 to 100, m is from 0 to 50 and n+m ≧ 1, and diols, some of which are described in DE-A-39 27 630, of the formula (II)

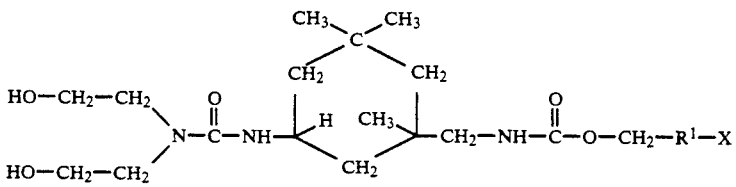

where R¹ is a straight-chain or branched or cyclic radical of 1 to 40 carbon atoms which contains from 20 to 86% by weight of carbon atoms, or

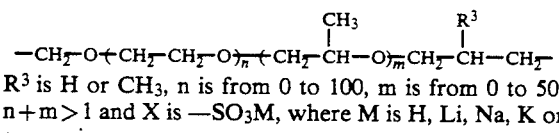

R³ is H or CH₃, n is from 0 to 100, m is from 0 to 50, n+m > 1 and X is —SO₃M, where M is H, Li, Na, K or ammonium.

The ratio of components B1 and B2 to one another is advantageously chosen according to the specific surface area of the magnetic material used.

The triols for component C) are compounds of 3 to 10, preferably 3 to 6, carbon atoms. Examples of appropriate triols are glycerol and trimethylolpropane. Low molecular weight reaction products of, for example, trimethylolpropane with ethylene oxide and/or propylene oxide are also suitable. The presence of triols in the polyaddition leads to branching of the end product which, unless local crosslinking occurs, has an advantageous effect on the mechanical properties of the polyurethane. For example, erythritol, pentaerythritol and sorbitol can be used here as polyols.

For the formation of the NCO-containing intermediates, the components stated under A, B and C are reacted with aliphatic, cycloaliphatic or aromatic diisocyanates of 6 to 30 carbon atoms (component D). Compounds such as toluylene 2,4-diisocyanate, toluylene 2,6-diisocyanate, m- and p-tetramethylol diisocyanate, mphenylene diisocyanate, 4-chlorophenylene 1,3-diisocyanate, naphthylene 1,5-diisocyanate, hexamethylene 1,5-diisocyanate, hexamethylene 1,6-diisocyanate, cyclohexylene 1,4-diisocyanate, tetrahydronaphthylene 1,5-diisocyanate, 4,4'-diphenylmethane diisocyanate, dicyclohexylmethane diisocyanate, isophorone diisocyanate and mixtures thereof are suitable for this purpose.

The NCO-containing intermediates obtained from components A to D are then reacted with the amino alcohols (component E) to give the OH-containing polyurethaneurea elastomers. These amino alcohols of 2 to 16, preferably 3 to 6, carbon atoms include monoethanolamine, methylisopropanolamine, ethylisopropanolamine, methylethanolamine, 3-aminopropanol, 1-ethylaminobutan2-ol, 4-methyl-4-aminopentan-2-ol and N- (2-hydroxyethyl)aniline. Aminodiols are particularly suitable since the addition thereof at the chain end results in a doubling of the OH number of the polymers. Diethanolamine and diisopropanolamine have proven particularly advantageous.

The ratio of components A) to D) is from 1.35 to 13 mol of diisocyanate per mole of polydiol with the use of from 0.3 to 10 mol of the diol of 2 to 20 carbon atoms and from 0.05 to 0.5 mol of triol, the amount of diol used depending in part on the molecular weight of the polydiol used. For practical reasons, however, it is advantageous to use the diisocyanate in an excess of not less than 3%, based on the amount required for complete conversion of the reactants, so that the ratio of the number of isocyanate groups used to the number of hydroxyl groups in the reaction mixture is from 1.03 to 1.3, preferably from 1.05 to 1.15. The NCO excess is then reacted stoichiometrically with the NH groups of the amino alcohol, so that the ratio of components A) to C):D:E is 1:1.03–1.3:0.03–0.3, preferably 1:1.05–1.15:0.05–0.15.

The thermoplastic, resilient OH-containing polyurethanes having said composition are prepared in solution by the 2-stage process, in the presence or absence of a catalyst and other assistants and/or additives. It is not possible to prepare these products by the solvent-free batch process. Since the presence of the triol and the reaction of the amine with NCO groups in the polyaddition in the absence of a solvent result in at least partial gel formation, the reaction is carried out in solution. In general, the danger of local overcrosslinking, as occurs in the polyaddition in the absence of a solvent, is avoided in the solution polyaddition.

In the 2-stage process, two different procedures are possible depending on the reaction conditions (amount of solvent, heat of reaction).

Procedure 1: The diisocyanate is initially taken with a little solvent, after which components A, B and C and, if required, the catalyst and the assistants and additives in a solvent are added at from 20° to 90° C., preferably from 30° to 70° C., in the course of 0.2 to 5 hours. The components are reacted until the desired NCO content is reached, after which component E is added in the second stage.

Procedure 2: In this process, all starting components A to D are dissolved in some of the solvent to form a solution having a solids content of from 15 to 50% by weight. The stirred solution is then heated to 20°–90° C., preferably 30°–70° C., if necessary after the addition of a catalyst. The components are then reacted until the desired NCO content has been reached, after which component E is added in the second stage.

In the 2-stage process, an excess of NCO relative to components A to C is employed in the first stage. In both procedures, it is possible to begin the reaction in some of the solvent and to add the remaining solvent during or after the reaction.

Tetrahydrofuran is preferably used as a solvent for the preparation of the polyurethanes. Depending on the field of use, it is of course also possible to prepare the polyurethanes in other polar solvents, such as dioxane, cyclohexanone, methyl ethyl ketone, dimethylformamide, N-methylpyrrolidone, dimethyl sulfoxide or ethylglycol acetate. The stated solvents can also be mixed with aromatics, such as toluene or xylene, and esters, such as ethyl or butyl acetate.

Examples of suitable catalysts for the preparation of polyurethanes and for the crosslinking reaction are tertiary amines, such as triethylamine, triethylenediamine, N-methylpyridine and N-methylmorpholine, metal salts, such as tin octoate, lead octoate and zinc stearate, and organometallic compounds, such as dibutyltin laurate. The suitable amount of catalyst is dependent on the activity of the relevant catalyst. In general, it has proven advantageous to use from 0.005 to 0.3, preferably from 0.01 to 0.1, part by weight per 100 parts by weight of polyurethane.

The polyurethanes typical of the novel recording media can be used as the sole binder for the preparation of magnetic layers. However, for specific intended uses of magnetic recording media, it may be advantageous to add a second binder component in amounts of from 5 to 50, preferably from 10 to 40, parts by weight, based on the resulting total amount of binder.

The physically drying binders present in the binder mixture with the stated special polyurethanes are known. They are polyvinylformal binders prepared by hydrolysis of a polymer of a vinyl ester and subsequent reaction of the vinyl alcohol polymer with formaldehyde. The polyvinylformals advantageously contain not less than 65, in particular not less than 80, % by weight of vinylformal groups. Suitable polyvinylformals contain from 5 to 13% by weight of vinyl alcohol groups and from 80 to 88% by weight of vinylformal groups and have a specific gravity of about 1.2 and a viscosity of from 50 to 120 mpa.s, measured at 20° C. using a solution of 5 g of polyvinylformal in 100 ml of 1:1 phenyl/toluene, having a K value according to Fikentscher of from 40 to 70 (1% strength in dimethylformamide). In addition to the polyvinylformal, vinyl chloride/diol mono- or di(meth)acrylate copolymers, which can be prepared, for example, in a conventional manner by solution copolymerization or suspension copolymerization of vinyl chloride and the diol monomethacrylate or monoacrylate, are also suitable. The diol mono- or diacrylate or methacrylate used for this purpose is an esterification product of acrylic acid or methacrylic acid with the corresponding molar amount of aliphatic diol of 2 to 4 carbon atoms, such as ethylene glycol, butane-1,4-diol or preferably propanediol, the propanediol preferably consisting of propane-1,3-diol and from 0 to 50% by weight of propane1,2-diol. The copolymers advantageously have a vinyl chloride content of from 50 to 95% by weight and a diol acrylate or methacrylate content of from 5 to 50% by weight. Particularly suitable copolymers preferably contain from 70 to 90% by weight of vinyl chloride and from 10 to 30% by weight of diol monoacrylate of diol monomethacrylate. A 15% strength solution of particularly suitable copolymers, such as the vinyl chloride/propanediol monoacrylate copolymers, in a mixture of equal volumes of tetrahydrofuran and dioxane has a viscosity of about 30 mpa.s at 25° C. The K value according to H. Fikentscher (Cellulosechemie 13 (1932), 58 et seq.) of the particularly suitable products is from 30 to 50, preferably about 40 (1% strength in dimethylformamide). It is also possible to use phenoxy resins whose constitution corresponds to the formula

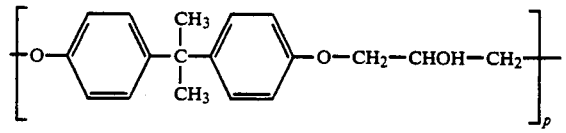

where p is roughly 100. These are polymers as described in, for example, DE-B 1 295 011. Cellulose ester binders are also suitable in the stated binder mixture. These are esterification products of cellulose with carboxylic acids of 1 to 4 carbon atoms, eg. cellulose acetate, cellulose triacetate, cellulose acetopropionate and cellulose acetobutyrate.

Processing of the special branched polyurethanes having OH-containing urea groups at the chain ends, if necessary as a mixture with other binders and together with the magnetic material and the conventional assistants, to give the novel recording media is carried out in a conventional manner.

The conventional pigments which substantially influence the properties of the resulting magnetic layers, eg. gamma-iron(III) oxide, finely divided magnetite, ferromagnetic undoped or doped chromium dioxide or cobalt-modified gamma-iron(III) oxide, as well as ferrites and metal pigments, can be used as anisotropic magnetic materials. Acicular gamma-iron(III) oxide, Codoped iron(III) oxide and ferromagnetic chromium dioxide are preferred. The particle size is in general from 0.15 to 2 $\mu$m, preferably from 0.15 to 0.8 $\mu$m.

The novel binders can be used in formulations without additional use of low molecular weight dispersants. However, it is also possible to add amounts of dispersant which are small in comparison with the prior art, for example lecithins, N-tallow fatty 1,3-diaminodioleate, polycarboxylic acids, mono-, di- or polysulfonic acids, phosphoric acids and mixtures thereof or esters or salts with metals of the first to fourth groups of the periodic table.

Furthermore, the magnetic layers contain small amounts of additives, such as lubricants, as well as fillers, which are admixed during dispersing of the magnetic materials or during production of the magnetic layer. Examples of such additives are fatty acids or isomerized fatty acids, such as stearic acid, or salts thereof with metals of the first to fourth main groups of the periodic table of elements, and fatty acid esters or waxes, silicone oils, carbon black, etc. The amount of additives is the conventional one and is in general less than 10% by weight, based on the magnetic layer.

The ratio of magnetic material to binder in the novel recording materials is from 1 to 10, in particular from 3 to 6, parts by weight of magnetic material per part by weight of the binder mixture. It is particularly advantageous that, owing to the excellent pigment binding capacity of the special polyurethanes, high concentrations of magnetic material in the magnetic layers are possible without the mechanical-elastic properties deteriorating or the performance characteristics suffering.

The conventional rigid or flexible substrates, in particular films of linear polyesters, such as polyethylene terephthalate, in general having thicknesses of from 4 to 200 μm, in particular from 6 to 36 μm, can be used as nonmagnetic and nonmagnetizable substrates. Recently, the use of magnetic layers on paper substrates for electronic computing and accounting machines has also become important; the novel coating materials can also advantageously be used for this purpose.

The novel magnetic recording media can be produced in a known manner. Advantageously, the magnetic pigment dispersion prepared in a dispersing apparatus, for example a tubular ball mill or a stirred ball mill, from the magnetic material and a solution of the binder with the addition of dispersants and other additives is filtered, if necessary after admixing the polyisocyanate crosslinking agent, and is applied to the nonmagnetic substrate by means of a conventional coating apparatus, for example a knife coater. As a rule, magnetic orientation is effected before the liquid coating mixture has dried on the substrate; the latter is advantageously effected in the course of from 10 to 200 seconds at from 50° to 90° C. The magnetic layers can be calendered and compacted on conventional apparatuses by being passed between heated and polished rollers, if necessary under pressure and at from 25° to 100° C., preferably from 60° to 80° C.

It has proven very advantageous in the case of the crosslinking of the binders, which may be carried out in addition, to effect calendering before crosslinking is complete, since the OH-containing polymers in the uncrosslinked state can be very readily compacted without becoming tacky. The thickness of the magnetic layer is in general from 0.5 to 20 μm, preferably from 1 to 10 μm. In the case of the production of magnetic tapes, the coated films are slit in the longitudinal direction into the conventional widths, generally measured in inches.

Compared with the prior art polyurethanes, the known magnetic materials can be processed in the novel sulfonate-containing polyurethanes readily and especially in a very short time and with very little energy consumption, in conventional dispersing apparatuses, to give homogeneous dispersions having a high pigment content.

Furthermore, the novel magnetic recording media have improved electroacoustic properties and abrasion resistance compared with those produced using the prior art polyurethanes or polyurethane mixtures and suitable harder coating resin components as the binder. In addition, magnetically and hence electroacoustically improved magnetic recording media are obtained in a simpler and shorter procedure with the aid of the OH-containing polyurethane binder crosslinked with the polyisocyanate. Another advantage is that the polymers suitable for the novel magnetic recording media give, as a result of the crosslinking, magnetic layers which are also resistant to high temperatures and atmospheric humidity.

In the Examples and Comparative Experiments which follow, parts and percentages are by weight, unless stated otherwise. Parts by volume bear the same relation to parts by weight as that of the liter to the kilogram.

Polymer A

In a heatable reaction vessel having a capacity of 150,000 parts by volume and equipped with a stirrer and a reflux condenser, 6,841 parts of a polyesterdiol obtained from adipic acid and butane-1,4-diol (molecular weight about 1,000), 777 parts of butane-1,4-diol, 437 parts of a polyether-1,3-diol sulfonate (molecular weight 1,340) and 44 parts of trimethylolpropane are dissolved, together with 4,275 parts of 4,4'-diphenylmethane diisocyanate, in 37,120 parts of tetrahydrofuran and the solution is heated to 60° C. The components are reacted to a final viscosity of 2 Pa.s (at 60° C.). The NCO content is 0.03%. Thereafter, the solution is diluted to a solids content of 12.5% with 50,380 parts of tetrahydrofuran. At the same time, the reaction is terminated by adding 127 parts of diethanolamine. The K value of the polymer formed is 59.1, measured as a 1% strength solution in dimethylformamide.

Polymer B

The composition and preparation are as described for polymer A. However, the components are reacted only to a final viscosity of 0.5 Pa.s (at 60° C.). The NCO content is 0.1%. The K value of the polymer formed is 52.3, measured as a 1% strength solution in dimethylformamide.

Polymer C

In a heatable reaction vessel having a capacity of 150,000 parts by volume and equipped with a stirrer and a reflux condenser, 6,897 parts of a polyesterdiol obtained from adipic acid and butane-1,4-diol (molecular weight about 1,000), 791 parts of butane-1,4-diol, 330 parts of a polyether-1,3-diol sulfonate (molecular weight 1,340) and 44 parts of trimethylolpropane are dissolved, together with 4,311 parts of 4,4'-diphenylmethane diisocyanate, in 371,217 parts of tetrahydrofuran and the solution is heated to 60° C. The components are reacted to a final viscosity of 2 Pa.s (at 60° C.). The NCO content is 0.03%. Thereafter, the solution is diluted to a solids content of 12.5% with 50,383 parts of tetrahydrofuran. At the same time, the reaction is terminated by adding 128 parts of diethanolamine. The K value of the polymer formed is 58.3, measured as a 1% strength solution in dimethylformamide.

Polymer D

In a heatable reaction vessel having a capacity of 150,000 parts by volume and equipped with a stirrer and a reflux condenser, 8,912 parts of a polyesterdiol obtained from adipic acid, isophthalic acid and hexane1,6-diol (molecular weight about 1,000), 1,021 parts of butane-1,4-diol, 574 parts of a polyether-1,3-diol sulfonate (molecular weight 1,340) and 57 parts of trimethylolpropane are dissolved, together with 5,721 parts of 4,4'-diphenylmethane diisocyanate, in 48,357 parts of tetrahydrofuran and the solution is heated to 60° C. The components are reacted to a final viscosity of 250 mPa.s (at 60° C). The NCO content is 0.09%. Thereafter, the solution is diluted to a solids content of 16.5% with 34,472 parts of tetrahydrofuran. At the same time, the reaction is terminated by adding 180 parts of diethanolamine. The K value of the polymer formed is 50.1, measured as a 1% strength solution in dimethylformamide.

Polymer E

The composition and preparation are as described for polymer D. However, the reaction is terminated with 222 parts of dibutylamine instead of with diethanolamine.

Polymer F

In a heatable reaction vessel having a capacity of 150,000 parts by volume and equipped with a stirrer and a reflux condenser, 6,637 parts of a polycarbonatediol (molecular weight about 2,000), 4,195 parts of ethoxylated 2,2-bis-(4-hydroxyphenyl)-propane, 560 parts of a polyether-1,3-diol sulfonate (molecular weight 1,340) and 74 parts of trimethylolpropane are dissolved, together with 4,818 parts of 4,4'-diphenylmethane diisocyanate, in 48,194 parts of tetrahydrofuran and the solution is heated to 60° C. The components are reacted to a final viscosity of 250 mpa. s (at 60° C.). The NCO content is 0.06%. Thereafter, the solution is diluted to a solids content of 16.5% with 34,470 parts of tetrahydrofuran. At the same time, the reaction is terminated by adding 179 parts of diethanolamine. The K value of the polymer formed is 51.3, measured as a 1% strength solution in dimethylformamide.

Polymer G (comparative product)

In a heatable reaction vessel having a capacity of 150,000 parts by volume and equipped with a stirrer and a reflux condenser, 7,071 parts of a polyesterdiol obtained from adipic acid and butane-1,4-diol (molecular weight about 1,000), 833 parts of butane-1,4-diol and 45 parts of trimethylolpropane are dissolved, together with 4,419 parts of 4,4'-diphenylmethane diisocyanate, in 37,107 parts of tetrahydrofuran and the solution is heated to 60° C. The components are reacted to a final viscosity of 2 Pa. s (at 60° C.). The NCO content is 0.05%. Thereafter, the solution is diluted to a solids content of 12.5% with 50,393 parts of tetrahydrofuran. At the same time, the reaction is terminated by adding 131 parts of diethanolamine. The K value of the polymer formed is 59.8, measured as a 1% strength solution in dimethylformamide.

Polymer H (comparative product)

In a heatable reaction vessel having a capacity of 150,000 parts by volume and equipped with a stirrer and a reflux condenser, 9,273 parts of a polyesterdiol obtained from adipic acid, isophthalic acid and hexane1,6-diol (molecular weight about 1,000), 1,103 parts of butane-1,4-diol and 60 parts of trimethylolpropane are dissolved, together with 5,847 parts of 4,4'-diphenylmethane diisocyanate, in 48,847 parts of tetrahydrofuran and the solution is heated to 60° C. The components are reacted to a final viscosity of 2 Pa. s (at 60° C.). The NCO content is 0.03%. Thereafter, the solution is diluted to a solids content of 16.5% with 34,474 parts of tetrahydrofuran. At the same time, the reaction is terminated by adding 189 parts of diethanolamine. The K value of the polymer formed is 58.7, measured as a 1% strength solution in dimethylformamide.

EXAMPLE 1

In phase I, 100 parts of a ferromagnetic chromium dioxide pigment having a coercive force (Hc) of 41.5 kA/m and a specific surface area (SSA) of 26.5 $m^2/g$ and 3 parts of an $\alpha$-iron oxide having a specific surface area of 3 $m^2/g$ and 8.33 parts of polymer B and 160 parts of tetrahydrofuran are introduced into a steel ball mill having a capacity of 6 l and containing 890 parts of steel balls and are dispersed in the course of 72 hours after thorough mixing. Thereafter, in phase II, a further 13.88 parts of polymer B, 1 part of isotridecyl stearate, 0.5 part of myristic acid and 102 parts of tetrahydrofuran are added and dispersing is continued for a further 72 hours. The dispersion is then filtered under pressure through a filter of 5 $\mu m$ pore diameter. A 23.5 $\mu m$ thick polyethylene terephthalate film is coated with the dispersion using a knife coater, and the coating is passed through a magnetic field and then dried at from 60° to 100° C. The magnetic layer is compacted and calendered by being passed between heated rollers (90° C., nip pressure 200 kg/cm). The resulting thickness is 3.5 $\mu m$. The coated film is then slit into 12.65 mm wide tapes.

COMPARATIVE EXPERIMENT 1

The procedure is as described in Example 1, except that polymer G is used as the polyurethane elastomer.

COMPARATIVE EXPERIMENT 2

The procedure is as described in Example 1, except that a product prepared by the melt condensation process and as described, for example, in German Published Application DAS 1,295,001 is used as the polyurethane elastomer.

The gloss is determined in a manual coating test at an angle of 60°, using a Dr. Lange reflectometer. The higher the gloss values, the better the dispersing result.

For this purpose, a 24 $\mu m$ thick polyethylene terephthalate film is manually coated using a 40 $\mu m$ knife coater at a draw-off speed of 1 m/s.

The magnetic properties are measured using a vibrating sample magnetometer in a magnetic field of 100 kA/m. The residual induction $M_r$ in [mT] and the orientation ratio OR, ie. the ratio of the residual induction in the playing direction to that in the crosswise direction, are determined.

TABLE 1

|  | Polymer | Gloss (60° C.) after phase I | Gloss (60° C.) after phase II | OR | $M_r$ [mT] |
|---|---|---|---|---|---|
| Example 1 | B | 87 | 26 | 2.6 | 167 |
| Comp. Example 1 | G | no dispersing | | | |
| Comp. Example 2 | | 13 | 7 | 1.8 | 119 |

EXAMPLES 2, 3 and 4

The procedure is as described in Example 1, except that the corresponding polymers D, E and F, respectively, are used as the polyurethane elastomer.

COMPARATIVE EXPERIMENT 3

The procedure is as described in Example 1, except that polymer H is used as the polyurethane elastomer.

COMPARATIVE EXPERIMENT 4

The procedure is as described in Example 1, except that a mixture of 78 parts of polymer H and 22 parts of a polyvinylformal consisting of 82% of vinylformal units, 12% of vinyl acetate units and 6% of vinyl alcohol units is used instead of polymer B in phase I, and polymer H is used instead of polymer B in phase II. Furthermore, 0.5 part of N-tallow fatty-1,3-diaminodioleate and 1 part of zinc stearate, are also added as dispersants in phase I. All other components and the procedure are as described in Example 1.

The Table below summarizes the test results. The advantages of the novel polymers D, E and F over the conventional polymer H are evident from the dispersing result alone. When polymer H is used without additional assistants, proper dispersing is not possible (Comparative Experiment 3). The preparation of dispersions with which magnetic tapes can be obtained is possible only with the addition of polyvinylformal and of dispersants.

TABLE 2

|  | Polymer | Gloss (60° C.) after phase I | Gloss (60° C.) after phase II | OR | $M_r$ [mT] |
|---|---|---|---|---|---|
| Example 2 | D | 85 | 68 | 3.0 | 158 |
| Example 3 | E | 81 | 62 | 3.0 | 177 |
| Example 4 | F | 92 | 76 | 3.1 | 175 |
| Comp. Experiment 3 | H | no dispersing | | | |
| Comp. Experiment 4 | H | 84 | 51 | 3.1 | 168 |

The substantial superiority of the magnetic tapes according to Examples 2 to 4 over a conventional tape according to Comparative Example 4 is evident also from the abrasion characteristics, which are a measure of the mechanical stability of the magnetic layer.

The abrasion characteristics during use are determined as follows: magnetic tapes are made up into computer tape cassettes for IBM 3480 cassette drives. The computer tape cassette is written on from the beginning of the tape to the end of the tape on a cassette drive (eg. IBM 3,480 or Comparex 6380). The tape is then rewound to the beginning. This process is repeated 400 times. The write/read head is not cleaned between cycles. After the end of the 400 cycles, a transparent self-adhesive tape is stuck to the write/read head. The abraided material deposited on the write/read head during the 400 cycles is thus removed by the self-adhesive tape. The self-adhesive tape is then stuck to white paper and the abrasion is assessed visually. The following ratings are allocated for this purpose:

| Abrasion rating | | |
|---|---|---|
| 1 | very good | no blackening |
| 2 | good | slight blackening |
| 3 | satisfactory | clear blackening |
| 4 | adequate | pronounced blackening |
| 5 | poor | parts of layer torn off |

While the magnetic tape in Comparative Example 4, produced using the conventional binder, shows traces of abrasion with a clearly formed head structure, virtually no abrasion is found in the case of the magnetic tape cassettes produced using the novel binders:

TABLE 3

|  | Abrasion rating |
|---|---|
| Example 2 | 1-2 |
| Example 3 | 1 |
| Example 4 | 1-2 |
| Comp. Experiment 4 | 2-3 |

We claim:
1. A magnetic recording medium consisting of a nonmagnetic substrate and at least one magnetic layer bonded thereon and based on a magnetic material distributed in a binder-consisting of not less than 50% by weight of a thermoplastic polyurethane, wherein the thermoplastic polyurethane used is an isocyanate-free, branched polyurethane which is soluble in tetrahydrofuran and has OH-containing urea groups at the chain ends and a molecular weight of from 30,000 to 200,000 and which is prepared from

A) 1 mol of a polydiol having a molecular weight of from 400 to 10,000,
B) from 0.3 to 10 mol of a mixture of B1) one or more diols of 2 to 18 carbon atoms and B2) a diol having one or more sulfonate groups,
C) from 0.01 to 1 mol of a tri- or polyol of 3 to 25 carbon atoms,
D) from 1.3 to 13 mol of one or more diisocyanates of 6 to 30 carbon atoms and
E) from 0.09 to 2 mol of an amino alcohol of 2 to 16 carbon atoms, with the proviso that the ratio of the OH groups of the components A to C to the NCO groups of component D to the amino groups of component E is 1:1.03–1.3:0.03–0.3.

2. A magnetic recording medium consisting of a nonmagnetic substrate and one or more magnetic layers bonded thereon and based on a magnetic material distributed in a binder consisting of not less than 50% by weight of a thermoplastic polyurethane, wherein the thermoplastic polyurethane used is an isocyanate-free, branched polyurethane which is soluble in tetrahydrofuran and has OH-free urea groups at the chain ends and a molecular weight of from 30,000 to 200,000 and which is prepared from A) 1 mol of a polydiol having a molecular weight of from 400 to 10,000,
B) from 0.3 to 10 mol of a mixture of
 B1) one or more diols of 2 to 18 carbon atoms and
 B2) a diol having one or more sulfonate groups,,
C) from 0.01 to 1 mol of a tri- or polyol of 3 to 10 carbon atoms,
D) from 1.3 to 13 mol of one or more diisocyanates of 6 to 30 carbon atoms and
E) from 0.09 to 2 mol of an OH-free monoamine of 2 to 16 carbon atoms, with the proviso that the ratio of the OH groups of components A to C to the NCO groups of component D to the amino groups of component E is 1:1.03–1.3:0.03–0.3.

3. A magnetic recording medium as claimed in claim 1, wherein the isocyanate-free, branched polyurethane which is soluble in tetrahydrofuran and has OH-containing urea groups at the chain ends and a molecular weight of from 30,000 to 200,000 is crosslinked with an isocyanate selected from the group consisting of the di-, tri- and polyisocyanates and of the isocyanate prepolymers having a molecular weight of up to 10,000.

4. A magnetic recording medium as claimed in claim 2, wherein the isocyanate-free, branched polyurethane which is soluble in tetrahydrofuran and has OH-free urea groups at the chain ends and a molecular weight of from 40,000 to 200,000 is crosslinked with an isocyanate selected from the group consisting of the di-, tri- and polyisocyanates and of the isocyanate prepolymers having a molecular weight of up to 10,000.

5. A magnetic recording medium as claimed in claim 1, wherein component B2) is a compound of the formula (I)

$$R^1CH_2O-(C_2H_4O-)_n(C_3H_7O-)_mCH_2CHR^3CH_2-SO_3X \qquad (I)$$

where $R^1$ is

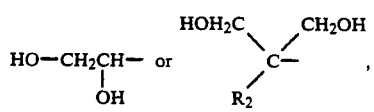

$R^2$ is $CH_3-$, $C_2H_5-$ or $C_3H_7-$, $R^3$ is $H-$ or $CH_3-$, X is $H-$, an alkali metal or ammonium, n is from 0 to 100, m is from 0 to 50 and $n+m \geq 1$.

6. A magnetic recording medium as claimed in claim 2, wherein component B2) is a compound of the formula (I)

$$R^1CH_2O-(C_2H_4O-)_n(C_3H_7O-)_mCH_2CHR^3CH_2-SO_3X \qquad (I)$$

where $R^1$ is

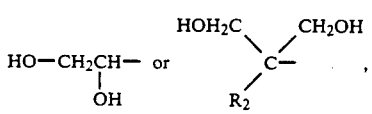

$R^2$ is $CH_3-$, $C_2H_5-$ or $C_3H_7-$, $R^3$ is $H-$ or $CH_3-$, X is $H-$, an alkali metal or ammonium, n is from 0 to 100, m is from to 50 and $n+m \geq 1$.

7. A magnetic recording medium as claimed in claim 3, wherein component B2) is a compound of the formula (I)

$$R^1CH_2O-(C_2H_4O-)_n(C_3H_7O-)_mCH_2CHR^3CH_2-SO_3X \qquad (I)$$

where $R^1$

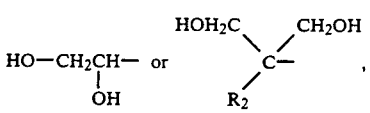

$R^2$ is $CH_3-$, $C_2H_5$ or $C_3H_7-$, $R^3$ is $H-$ or $CH_3-$, X is $H-$, an alkali metal or ammonium, n is from 0 to 100, m is from 0 to 50 and $n+m > 1$.

8. A magnetic recording medium as claimed in claim 4, wherein component B2) is a compound of the formula (I)

$$R^1CH_2O-(C_2H_4O-)_n(C_3H_7O-)_mCH_2CHR^3CH_2-SO_3X \qquad (I)$$

where $R^1$ is

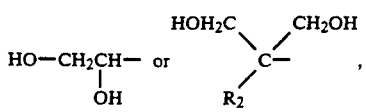

$R^2$ is $CH_3-$, $C_2H_5-$ or $C_3H_7-$, $R^3$ is $H-$ or $CH_3-$, X is $H-$, an alkali metal or ammonium, n is from 0 to 100, m is from 0 to 50 and $n+m \geq 1$.

9. A magnetic recording medium as claimed in claim 1, wherein component B2) is a compound of the formula (I)

$$R^1CH_2O-(C_2H_4O-)_n(C_3H_7O-)_mCH_2CHR^3CH_2-SO_3X \qquad (I)$$

where $R^1$ is

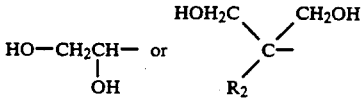

$R^2$ is $CH_3-$, $C_2H_5-$ or $C_3H_7-$, $R^3$ is $H-$ or $CH_3-$, X is $H-$, an alkali metal or ammonium, n is from 0 to 100, m is from 0 to 50 and $n+m > 1$, and 4,4'-diphenylmethane diisocyanate is used as component D).

10. A magnetic recording medium as claimed in claim 2, wherein component B2) is a compound of the formula (I)

$$R^1CH_2O-(C_2H_4O-)_n(C_3H_7O-)_mCH_2CHR^3CH_2-SO_3X \qquad (I)$$

where $R^1$ is

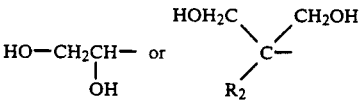

$R^2$ is $CH_3-$, $C_2H_5-$ or $C_3H_7-$, $R^3$ is $H-$ or $CH_3-$, X is $H-$, an alkali metal or ammonium, n is from 0 to 100, m is from 0 to 50 and $n+m \geq 1$, and 4,4'-diphenylmethane diisocyanate is used as component D).

11. A magnetic recording medium as claimed in claim 3, wherein component B2) is a compound of the formula (I)

$$R^1CH_2O-(C_2H_4O-)_n(C_3H_7O-)_mCH_2CHR^3CH_2-SO_3X \qquad (I)$$

where $R^1$ is

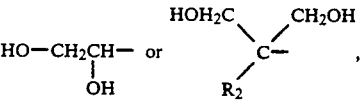

$R^2$ is $CH_3-$, $C_2H_5-$ or $C_3H_7-$, $R^3$ is $H-$ or $CH_3-$, X is $H-$, an alkali metal or ammonium, n is from 0 to 100, m is from 0 to 50 and $n+m \geq 1$, and 4,4'-diphenylmethane diisocyanate is used as component D).

12. A magnetic recording medium as claimed in claim 4, wherein component B2) is a compound of the formula (I)

$$R^1Ch_2O-(C_2H_4O-)_n(C_3H_7O-)_mCH_2CHR^3CH_2-SO_3X \qquad (I)$$

where $R^1$ is

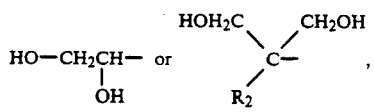

$R^2$ is $CH_3—$, $C_2H_5—$ or $C_3H_7—$, $R^3$ is $H—$ or $CH_3—$, X is $H—$, an alkali metal or ammonium, n is from 0 to 100, m is from 0 to 50 and $n+m \geq 1$, and 4,4'-diphenylmethane diisocyanate is used as component D).

13. A magnetic recording medium as claimed in claim 1, wherein component B2) is a diol of the formula (II)

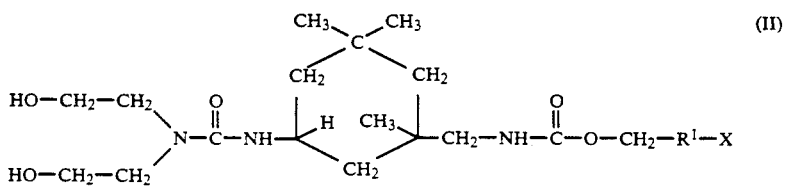

where $R^1$ is a straight-chain or branched or cyclic radical of 1 to 40 carbon atoms which contains from 20 to 86% by weight of carbon atoms, or

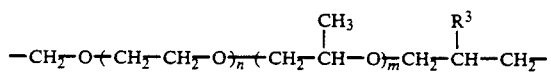

where $R^3$ is H or $CH_3$, n is from 0 to 100, m is from 0 to 50, $n+m \geq 1$ and X is $—SO_3M$, where M is H, Li, Na, K or ammonium.

14. A magnetic recording medium as claimed in claim 2, wherein component B2) is a diol of the formula (II)

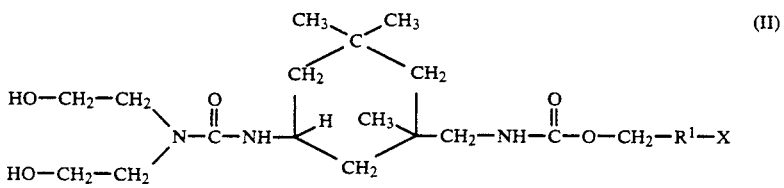

where $R^1$ is a straight-chain or branched or cyclic radical of 1 to 40 carbon atoms which contains from 20 to 86% by weight of carbon atoms, or

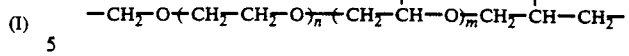

where $R^3$ is H or $CH_3$, n is from 0 to 100, m is from 0 to 50, $n+m \geq 1$ and X is $—SO_3M$, where M is H, Li, Na, K or ammonium.

15. A magnetic recording medium as claimed in claim 3, wherein component B2) is a diol of the formula (II)

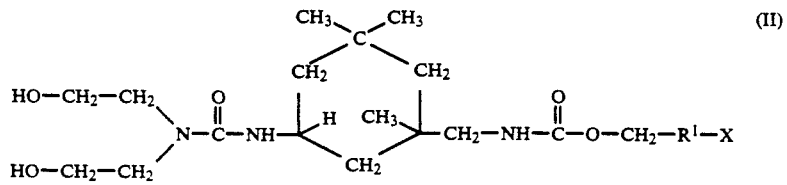

where $R^1$ is a straight-chain or branched or cyclic radical of 1 to 40 carbon atoms which contains from 20 to 86% by weight of carbon atoms, or

where $R^3$ is H or $CH_3$, n is from 0 to 100, m is from 0 to 50, $n+m \geq 1$ and X is $—SO_3M$, where M is H, Li, Na, K or ammonium.

16. A magnetic recording medium as claimed in claim 4, wherein component B2) is a diol of the formula (II)

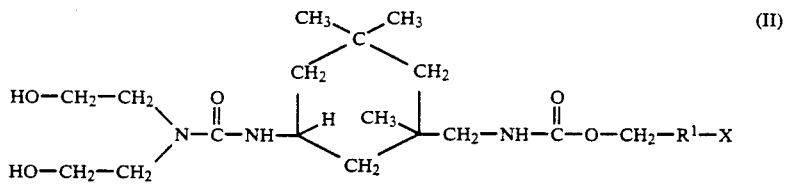

where $R^1$ is a straight-chain or branched or cyclic radical of 1 to 40 carbon atoms which contains from 20 to 86% by weight of carbon atoms, or where $R^3$ is H or $CH_3$, n is from 0 to 100, m is from 0 to 50, $n+m \geq 1$ and X is $-SO_3M$, where M is H, Li, Na, K or ammonium.

17. A magnetic recording medium as claimed in claim 1, wherein more than 80% of the terminal OH groups consist of a

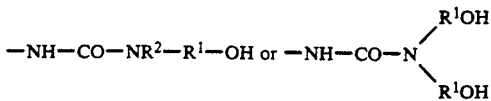

group, where $R^1$ is $-(CH_2)_n-$ $R^2$ is H, $-CH_3$ or $-(CH_2)_n-CH_3$ and n is from 1 to 10.

18. A magnetic recording medium as claimed in claim 1, wherein the isocyanate-free, branched polyurethane which is soluble in tetrahydrofuran and has OH-containing urea groups at the chain ends is used as the sole binder.

19. A magnetic recording medium as claimed in claim 2, wherein the isocyanate-free, branched polyurethane which is soluble in tetrahydrofuran and has OH-free urea groups at the chain ends is used as the sole binder.

* * * * *

UNITED STATES PATENT AND TRADEMARK OFFICE
CERTIFICATE OF CORRECTION

PATENT NO. : 5,266,408
DATED : Nov. 30, 1993
INVENTOR(S) : KEPPELER et al.

It is certified that error appears in the above-identified patent and that said Letters Patent is hereby corrected as shown below:

Claim 9, column 16, line 25, "n+m>1" should read --$n+m \geq 1$--.

Signed and Sealed this

Tenth Day of May, 1994

Attest:

BRUCE LEHMAN

Attesting Officer     Commissioner of Patents and Trademarks